United States Patent [19]

Lee et al.

[11] Patent Number: 4,932,464
[45] Date of Patent: Jun. 12, 1990

[54] METHOD AND SYSTEM FOR PREHEATING COMBUSTION AIR

[75] Inventors: George C. Y. Lee, Pleasant Hill; Narasimha Kudlu, Concord, both of Calif.

[73] Assignee: Bechtel Group, Inc., San Francisco, Calif.

[21] Appl. No.: 417,933

[22] Filed: Oct. 6, 1989

[51] Int. Cl.$^5$ .................. F28D 15/02; F23L 15/00
[52] U.S. Cl. ........................... 165/7; 165/36; 165/134.1; 165/921; 122/DIG. 2
[58] Field of Search ............... 165/921, 108, 7, 134.1, 165/35, 36; 122/DIG. 1, DIG. 2

[56] References Cited

U.S. PATENT DOCUMENTS

| | | | |
|---|---|---|---|
| 2,321,129 | 6/1943 | Cooper | 165/921 |
| 2,363,870 | 11/1944 | Karlsson et al. | 165/921 |
| 2,468,826 | 5/1949 | Karlsson et al. | 165/921 |
| 2,769,619 | 11/1956 | Juhasz | 165/921 |
| 2,947,522 | 8/1960 | Keller | 165/35 |
| 4,129,176 | 12/1978 | Heyn et al. | 165/35 |
| 4,318,366 | 3/1982 | Tompkins | 165/921 |
| 4,416,325 | 11/1983 | Barratt et al. | |
| 4,483,391 | 11/1984 | Gilbert | |
| 4,537,247 | 8/1985 | Okamoto et al. | 122/DIG. 2 |

OTHER PUBLICATIONS

"Air Heaters and Economizers", Power Magazine, Jun. 1988, pp. B-68 to B-70.

Primary Examiner—Albert W. Davis, Jr.
Attorney, Agent, or Firm—Townsend and Townsend

[57] ABSTRACT

A combustion air heating system includes both an air heater for preheating the combustion air by heat exchange with flue gases and an air preheater for preheating the combustion air prior to entry into the air heater. The air preheater operates by heat exchange between the combustion air discharge from the air heater and a bypass stream of combustion air located upstream of the air preheater. The amount of combustion air flowing through the bypass duct is controlled so that the temperature in the air heater does not fall below the dew point of the acid gases present in the flue gas.

13 Claims, 1 Drawing Sheet

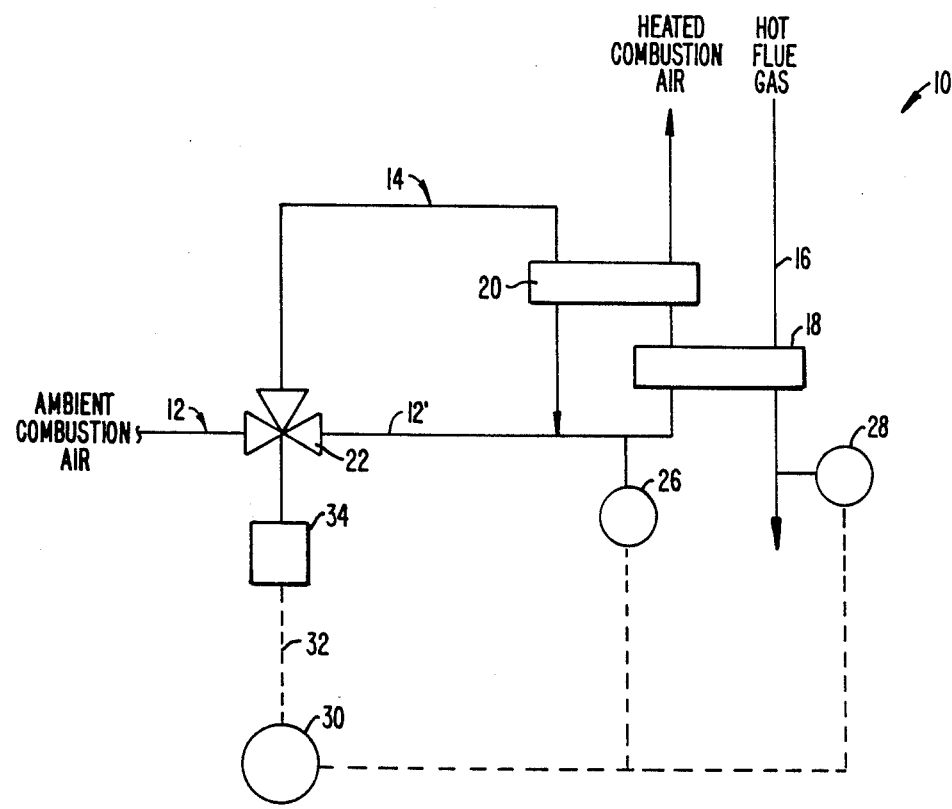
FIG._1.

METHOD AND SYSTEM FOR PREHEATING COMBUSTION AIR

BACKGROUND OF THE INVENTION

1. Field of the Invention

The present invention relates generally to the design, construction and operation of combustion air preheating systems with gas-to-gas heat exchangers. More particularly, the present invention is a heat exchange system which is suitable for preheating combustion air prior to introduction into conventional air heaters which utilize heat from hot flue gases to heat combustion air.

The combustion efficiency of fossil fuel burning equipment (e.g., a burner) can be increased by heating combustion air prior to introduction to the burner. This is typically achieved by heat exchange between the hot flue gases discharged from fossil fuel burning equipment and the cold inlet combustion air. For example, rotary air heaters (regenerative) and tubular air heaters (recuperative) may be used in this application.

Flue gases resulting from the combustion of many fossil fuel sources, such as high sulfur coals and fuel oils, can possess relatively high levels of acid gases, such as sulfur trioxide. The acid gases remain in the vapor phase so long as the temperature of the flue gas remains above the acid dew point. When the temperature falls below the dew point, however, the acid gases condense, typically forming sulfuric acid.

Condensation of acid gases within combustion air heaters has been problematic. Particularly during cold weather, the ambient air can extract sufficient heat from the flue gases so that the flue gas temperature falls below the dew point in the air heater. As most heat exchangers utilized in this application are constructed from carbon steel, the condensation of sulfuric acid can cause severe corrosion problems. Moreover, fly ash will adhere to the heat exchange surfaces which are wetted with the condensed acid, eventually fouling the passages in the heat exchanger.

To overcome this problem, combustion air preheaters using low pressure steam are usually provided to raise the temperature of the incoming ambient air sufficiently so that the temperature of the flue gas will not fall below the acid dew point. In particular, the temperature is raised sufficiently so that the "cold-end average temperature" is raised to within the range from about 160° F. to 185° F. The cold-end average temperature is defined as the average between the air inlet temperature to the air heater (i.e., the temperature from the air preheater) and the temperature of the cooled flue gases as they pass out of the air heater.

While the use of air preheaters to raise the cold-end average temperature is generally workable, the use of steam heat exchangers is often unreliable. Such steam heat exchangers are subject to freezing, leaking, and condensate contamination. To overcome these problems, many steam preheaters require circulation of hot water or a glycol through the tubes, which substantially complicates their design and operation. The use of glycol eliminates the freezing problem, but can result in corrosive oxidation products which require that the system be blanketed with nitrogen.

For these reasons, it would be desirable to provide improved methods and systems for preheating combustion air in order to raise the cold-end average temperature of the air entering the combustion air heater. Such systems should be of simple design, be inexpensive to build and to operate, and should be of compact size so that they may be retrofitted onto existing combustion systems in place of steam preheaters of the type just described.

2. Description of the Background Art

U.S. Pat. No. 4,483,391, describes a two stage preheater for combustion air where heated combustion air is recirculated to preheat the incoming combustion air which is in thermal contact with the lowest temperature flue gas. U.S. Pat. Nos. 4,416,325; 4,213,404; 4,037,543; 3,678,869; 3,509,834; 2,544,369; 2,128,431; and 2,088,225; all relate to the construction of gas-to-gas heat exchangers. An article entitled "Air Heaters and Economizers," which appeared in Power Magazine, June 1988, pages B-68 to B-70, describes the construction of convention heat exchangers which are used for preheating combustion air in fossil fuel boilers.

SUMMARY OF THE INVENTION

According to the present invention, a heat exchange system comprises a first heat exchanger connected to heat an inlet airstream, typically a combustion airstream, with a heated gas stream, typically a hot flue gas stream. Inlet air to the first heat exchanger is preheated by heat exchange with the heated inlet air discharged from the first exchanger. This is accomplished by providing a bypass conduit in an inlet air conduit upstream of the first heat exchanger. A second heat exchanger is then provided to heat the bypassed air with heated inlet air discharged from the first heat exchanger. The amount of inlet air diverted through the bypass conduit is controlled to provide a desired temperature difference between the preheated air entering the first heat exchanger and the cooled flue gas discharged from the first heat exchanger.

In a particular embodiment, the inlet conduit is a combustion air inlet duct and the heated gas conduit is a flue gas duct. Heat exchange between the combustion air duct and the flue gas duct is effected by a conventional air heater, such as a rotary air heater, tubular air heater, or heat pipe air heater. Heat exchange between the heated combustion airstream discharged from the air heater and the inlet combustion airstream is usually accomplished with a heat pipe air heater. The use of heat pipe air heaters is desirable since they provide a very uniform heat flux which in turn provides even heating of the combustion air. Moreover, their compact size allows the retrofitting of existing fossil fuel burning plants, typically large boilers, which employ steam preheating of the combustion air.

In a method according to the present invention, the temperature of the preheated combustion air which is directed into the air heater and the temperature of the flue gas stream which is discharged from the air heater are both monitored so that the cold-end average temperature can be determined. The amount of cold inlet combustion air which is diverted through the bypass duct is then controlled to maintain the cold-end average temperature above the sulfuric acid dew point. In this way, harmful acid condensation within the equipment is avoided.

BRIEF DESCRIPTION OF THE DRAWINGS

FIG. 1 is a schematic flow diagram illustrating the heat exchange system of the present invention.

FIG. 2 illustrates a first particular embodiment of a heat exchange system constructed in accordance with the principles of the present invention.

FIG. 3 is a cross-sectional view taken along line 3—3 of FIG. 2.

FIG. 4 is a cross-sectional view taken along line 4—4 of FIG. 2.

FIG. 5 illustrates a second particular embodiment of a heat exchange system constructed in accordance with the principles of the present invention.

FIG. 6 is a cross-sectional view taken along line 6—6 of FIG. 5.

FIG. 7 is a cross-sectional view taken along line 7—7 of FIG. 5.

DESCRIPTION OF THE SPECIFIC EMBODIMENTS

A heat exchange system 10 according to the present invention includes an air inlet conduit 12, a bypass conduit 14, and a heated gas conduit 16. The air inlet conduit 12 will typically be connected to a source of ambient combustion air while the heated gas conduit will typically carry hot flue gases, although the system 10 may be utilized to exchange heat between other gas streams.

A first heat exchanger 18 is provided to transfer heat from the heated gas conduit 16 to the inlet air conduit 12'. The first heat exchanger 18 thus provides the primary heat transfer mechanism between the hot gases and the cool gases in the heat exchange system 10. Before entering the first heat exchanger 18, however, the inlet air is preheated by bypassing a portion of the air in conduit 12 through a second heat exchanger 20 which is disposed to transfer heat from the airstream discharged from the first heat exchanger 18 to the bypass conduit 14. By recombining the preheated bypass airstream from conduit 14 with the main flow of inlet air through conduit 12', the combined airstreams will be preheated by an amount which is determined by the percentage of air which is bypassed through the conduit 14.

To control the temperature of air entering the first heat exchanger 18 (i.e., the temperature of the recombined inlet air and bypass airstreams), a diverter mechanism 22 is provided. Although illustrated at the location where the bypass conduit 14 branches from the air inlet conduit 12, the diverter mechanism 22 could just as well be located downstream at the location where the bypass conduit 14 rejoins the air inlet conduit 12'. Indeed, this latter configuration is illustrated in the two specific embodiments discussed in connection with FIGS. 2-4 and FIGS. 5-7, hereinafter. In any event, the diverter mechanism 22 will be able to pass a preselected portion of the inlet air through the bypass conduit 14 while allowing the remaining portion of the air to pass through the main air inlet conduit 12'.

When preheating ambient combustion air with hot flue gases in connection with supplying combustion air to a fossil fuel burner, it will be desirable to control the temperature of the preheated combustion air entering heat exchanger 18 so that the cold-end average temperature of the combustion air and the flue gas discharged from heat exchanger 18 is in the temperature range from about 160° F. to 185° F. To do so, a control system is provided which includes a first temperature sensor 26 which is located to sense the temperature of the preheated combustion air entering heat exchanger 18 and a second temperature sensor 28 which is located to sense the temperature of the flue gas discharged from heat exchanger 18. Temperature signals from both of the temperature sensors 26 and 28 are fed into an automatic controller 30 which calculates a control signal 32 which is fed to an actuator 34 which is able to position the diverter 22 so that a desired amount of ambient combustion air is diverted through the bypass 14. The automatic controller 30 may be analog or digital, and a variety of suitable temperature sensors, automatic controllers, and actuators, are commercially available.

Referring now to FIGS. 2-4, a first specific embodiment of a combustion air heating system 40 according to the present invention will be described. The combustion air heating system 40 comprises a combustion air fan 42 which is able to deliver a desired volume of ambient combustion air to a combustion air duct 44. A bypass duct 46 is connected to divert a portion of the combustion air flowing through duct 44 through a U-shaped loop which returns the combustion air to the combustion air duct a short distance downstream from the point from which it left. A swing damper 48 is provided at the outlet of the bypass duct 46 in order to control the amount of combustion air which is able to flow through the bypass duct. The swing damper 48 will be positionable between a fully closed position (where flow through the bypass duct 46 is blocked) to a fully opened position where approximately 80% to 90% of the combustion air flows through the bypass duct. An actuator 50 is provided to position the swing damper 48. The control system for positioning the swing damper 48 will be essentially as illustrated in FIG. 1.

A flue gas duct 52 is provided to carry flue gases discharged from a conventional fossil fuel burning equipment to a position adjacent to the combustion air duct 44. Typically, the flue duct and combustion air duct 44 will be disposed so that flow through the ducts will be in the opposite directions, as indicated by the arrows. An air heater 54 is provided to thermally couple the flue duct 52 and the combustion air duct 44. The air heater 54 may be any type of conventional heat exchange structure, including rotary air heaters, tubular air heaters, and heat pipe air heaters. The design and construction of such air heaters is well known in the art, as exemplified by the article entitled "Air Heaters and Economizers" which was cited hereinabove.

In the embodiment of FIGS. 2-4, the air heater 54 is a rotary type air heater, as best observed in FIG. 3. The rotary air heater includes a rotor assembly 56 which includes a plurality of radially-extending heat exchange elements 58. The rotor 56 is slowly rotated so that the heat exchange surfaces 58 pass successively through the hot flue gases in duct 52 and the preheated combustion air in duct 44. In this way, the heat exchange surfaces 58 are heated as they pass through duct 52 and are able to transfer that heat to the combustion air as they pass through duct 44.

An air preheater 60 is provided to thermally couple the heated combustion air discharged from the air heater 54 with the combustion air in bypass duct 46. As illustrated, the air preheater 60 is disposed immediately downstream of the air heater 54 and receives the heated air therefrom in a first chamber 62 (FIG. 4). The chamber 62 includes a plurality of heat pipes 64 which extend into a second chamber 66 through which the air in bypass duct 46 passes. The heat pipes 64 contain a working fluid, such as toluene or naphthalene. Heat from the heated air in chamber 62 evaporates the working fluid which will then pass to the end of the heat pipes 64 disposed in chamber 66. The cooler ambient air in chamber 66 condenses the working fluid (and air is thus heated), allowing the working fluid to pass back into the hotter air chamber 62. Typically, the heat pipes will be inclined so that the liquid will flow back into the heated chamber 62 while the vapor is able to pass into the cooler chamber 66. Usually, the heat pipes 64 will be provided with a plurality of heat exchange fins in order to promote efficient heat transfer with the environment.

Referring now to FIGS. 5-7, a second embodiment 70 of the combustion air heating system of the present invention is illustrated. The embodiment 70 is similar in most respects to the system illustrated in FIGS. 2-4, and common components have been numbered in a corresponding manner. Instead of employing a separate air heater 54 and air preheater 60, however, system 70 employs a single heat exchange structure which includes a first air heating section 72 (FIG. 6) and a second air heating section 74 (FIG. 7). The first air heating section 72 comprises a plurality of heat pipes 76 which extend from a flue gas chamber 78 to a combustion air chamber 80. The flue gas chamber 78 receives gases from the flue gas duct 52, while the combustion air chamber 80 receives air from the combustion air duct 44. The individual heat pipes 76 act to transfer heat from the flue gas chamber 78 to the combustion air chamber 80, as described hereinabove.

The second section 74 of the heat exchanger 72 includes both the first flue gas chamber 78 and combustion air chamber 80, as well as a third bypass chamber 82. Individual heat pipes 84 extend through all three chambers so that heat from both the flue gas chamber 78 and combustion air chamber 80 is transferred to the preheating chamber 82. The use of heat pipes for supplying all the heat transfer in the system of the present invention is particularly advantageous since it is both very compact (facilitating retrofitting of existing fossil fuel burners) and highly reliable in that no moving parts are required.

Although the foregoing invention has been described in detail for purposes of clarity of understanding, it will be obvious that certain modifications may be practiced within the scope of the appended claims.

What is claimed is:

1. A heat exchange system comprising:
   an air inlet conduit;
   a bypass conduit connected to receive air from and return air to the inlet conduit;
   a heated gas conduit;
   a first heat exchanger for transferring heat from the heated gas conduit to the air inlet conduit at a location downstream from the bypass conduit;
   a second heat exchanger on the air inlet conduit downstream from the first heat exchanger for transferring heat from the air inlet conduit to the bypass conduit; and
   means for controlling a portion of air which passes through the bypass conduit based on the temperature of inlet air to the first heat exchanger and the temperature of cooled gas discharged from the first heat exchanger.

2. A heat exchange system as in claim 1, wherein the heated gas conduit is a flue gas conduit from fossil fuel burning equipment and the air inlet conduit provides combustion air for the burner.

3. A heat exchange system as in claim 1, wherein the first heat exchanger is selected from the group consisting of a rotary air heater, a tubular air heater, and a heat pipe air heater.

4. A heat exchange system as in claim 1, wherein the second air heater is a heat pipe air heater.

5. A heat exchange system as in claim 1, wherein the means for controlling comprises a swing damper.

6. A heat exchange system as in claim 5, wherein the means for controlling further comprises means for sensing the temperature of the inlet air to the first heat exchanger, means for sensing the temperature of the cooled gas discharged from the first heat exchanger, an automatic controller which receives temperature signals from the temperature sensing means and produces a control signal based thereon, and an actuator which receives the control signal and positions the damper based on said control signal.

7. A combustion air heating system comprising:
   a combustion air fan;
   a combustion air duct connected to receive air from the combustion air fan;
   a bypass duct connected to receive air from and return air to the combustion air duct;
   a flue gas duct;
   an air heater which thermally couples the flue gas duct and the combustion air duct at a location downstream from the bypass duct, whereby hot flue gases heat the combustion air to produce heated combustion air and cooled flue gases;
   an air preheater which thermally couples the combustion air duct at a location downstream from the air heater to the bypass duct, whereby the heated combustion air preheats a portion of the cold combustion air which flows to the air heater; and
   means for selectively diverting the flow of combustion air between the combustion air duct and the bypass duct, whereby the temperature of the preheated air to the air heater can be controlled to avoid the condensation of acid gases within the air heater.

8. A combustion air heating system as in claim 7, wherein the air heater is a flue gas conduit from a fossil fuel burning equipment and the air inlet conduit provides combustion air for the burner.

9. A combustion air heating system as in claim 7, wherein the air heater is selected from the group consisting of a rotary air heater a tubular air heater, and a heat pipe air heater.

10. A combustion air heating system as in claim 7, wherein the means for selectively diverting is a swing damper.

11. A method for heating combustion air to a fossil fuel burner, said method comprising:
   heating inlet combustion air by exchange with a flue gas stream, from the burner to produce a heated combustion airstream and cooled flue gas stream;
   preheating a portion of a cold inlet airstream by exchange with the heated combustion airstream;
   recombining the preheated and other portions of the cold inlet airstream to produce the preheated inlet combustion air; and
   controlling the amount of cold air which is preheated so that the temperature of the preheated inlet combustion air being heated by exchange with the flue gas stream is sufficiently high so that the flue gas will not be cooled below the dew point o sulfuric acid.

12. A method as in claim 11, wherein the amount of cold air which is preheated is controlled so that the average of the preheated cold air temperature and the cooled flue gas stream is at least about 160° F.

13. A method as in claim 12, wherein the average temperature is in the range from about 160° F. to 185° F.

* * * * *

UNITED STATES PATENT AND TRADEMARK OFFICE
CERTIFICATE OF CORRECTION

PATENT NO. : 4,932,464

DATED : June 12, 1990

INVENTOR(S) : George C.Y. Lee and Narasimha Kudlu

It is certified that error appears in the above—identified patent and that said Letters Patent is hereby corrected as shown below:

In the drawings, sheets 2 and 3, including Figs. 2-7, should be added as attached.

Signed and Sealed this

Fifteenth Day of September, 1992

*Attest:*

DOUGLAS B. COMER

*Attesting Officer*      *Acting Commissioner of Patents and Trademarks*

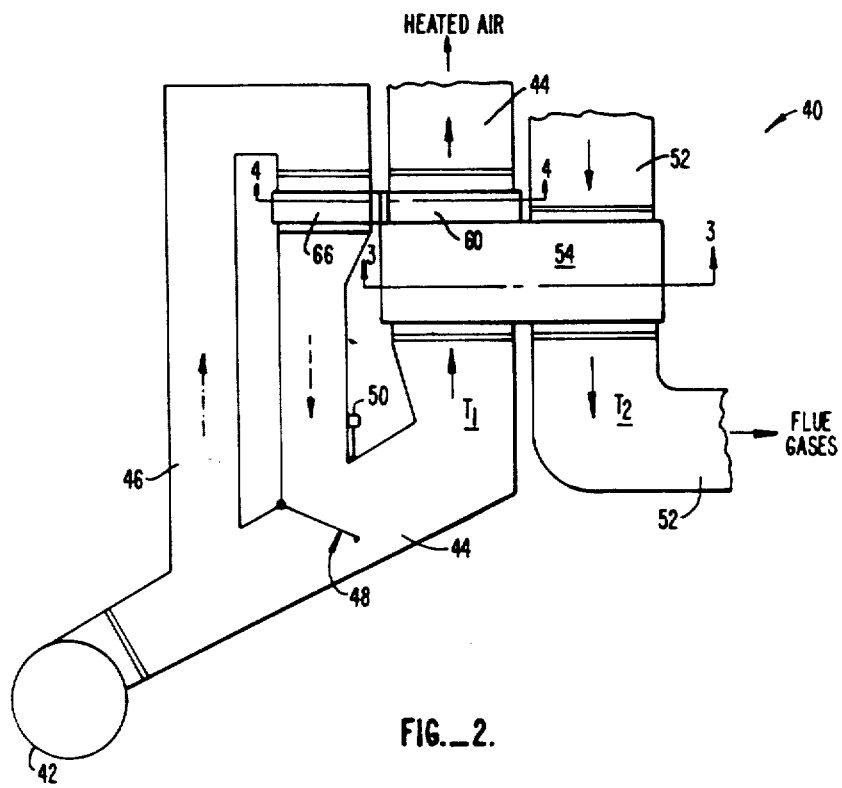
FIG._2.
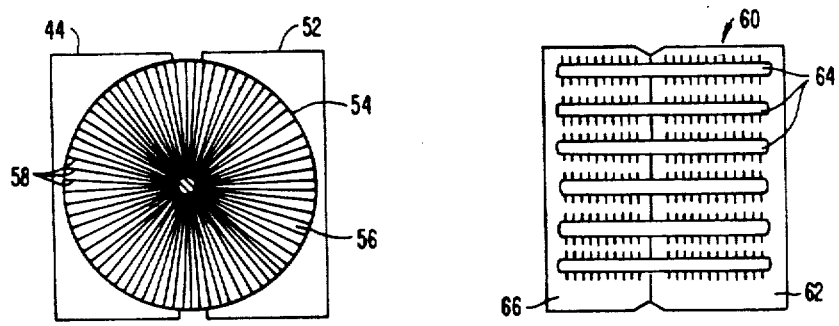
FIG._3.    FIG._4.

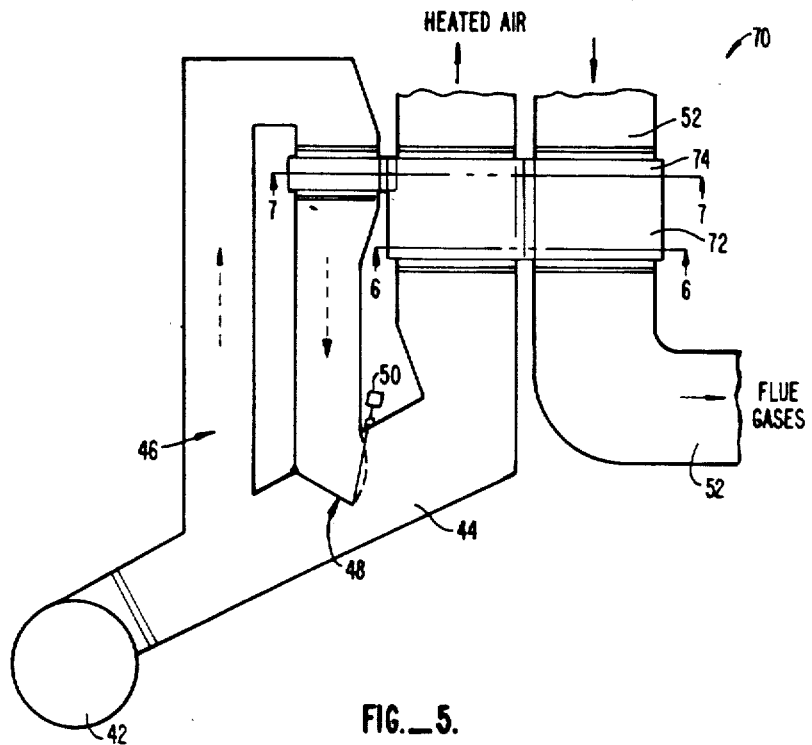
FIG._5.
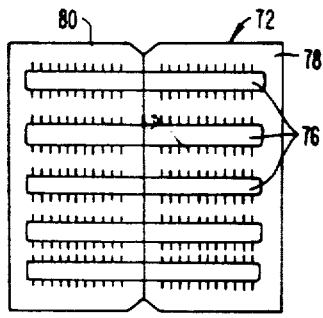
FIG._6.
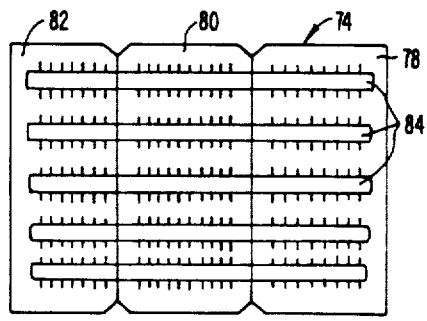
FIG._7.